US009673572B2

(12) United States Patent
Oettler

(10) Patent No.: US 9,673,572 B2
(45) Date of Patent: Jun. 6, 2017

(54) CONNECTION MODULE FOR FIELD DEVICE IN THE EXPLOSION-PROOF AREA

(75) Inventor: Matthias Oettler, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 556 days.

(21) Appl. No.: 14/374,548

(22) PCT Filed: Jan. 27, 2012

(86) PCT No.: PCT/EP2012/000364
§ 371 (c)(1),
(2), (4) Date: Jul. 25, 2014

(87) PCT Pub. No.: WO2013/110294
PCT Pub. Date: Aug. 1, 2013

(65) Prior Publication Data
US 2014/0377995 A1    Dec. 25, 2014

(51) Int. Cl.
*H02H 9/00* (2006.01)
*H01R 13/66* (2006.01)
*G05B 19/042* (2006.01)

(52) U.S. Cl.
CPC ....... *H01R 13/665* (2013.01); *G05B 19/0428* (2013.01); *G05B 2219/14011* (2013.01); *G05B 2219/24028* (2013.01)

(58) Field of Classification Search
CPC .................................................. H01R 13/665
USPC ........................................................ 361/119
See application file for complete search history.

(56) References Cited

U.S. PATENT DOCUMENTS

| 3,631,264 | A   |   | 12/1971 | Morgan |
| 3,845,356 | A   |   | 10/1974 | Bullard et al. |
| 4,161,008 | A   | * | 7/1979  | Zimmermann .......... H04B 3/46 330/207 P |
| 5,113,303 | A   | * | 5/1992  | Herres ................... H02H 5/105 340/649 |
| 6,275,881 | B1  |   | 8/2001  | Doege et al. |
| 6,721,810 | B2  |   | 4/2004  | Massie |

(Continued)

FOREIGN PATENT DOCUMENTS

| CN | 1449512 A     | 10/2003 |
| CN | 202049384 U   | 11/2011 |
| WO | 2003034564 A1 | 4/2003  |

OTHER PUBLICATIONS

English Translation of International Preliminary Report on Patentability, Application No. PCT/EP2012/000364, Aug. 13, 2013, 5 pages.

(Continued)

*Primary Examiner* — Stephen W Jackson
(74) *Attorney, Agent, or Firm* — LaBatt, LLC

(57) ABSTRACT

The invention relates to a connection module for field devices in the explosion-protected area, having a housing with a plurality of controller-end terminals to connect to at least one input/output module and with field-end terminals to connect to the field devices. The connection module is characterized in that different resistors are present in the housing to provide intrinsically safe pairs of field-end terminals with different characteristic values, said resistors being hardwired in the housing to different field-end terminals and/or controller-end terminals.

9 Claims, 2 Drawing Sheets

(56) References Cited

Figure 1:
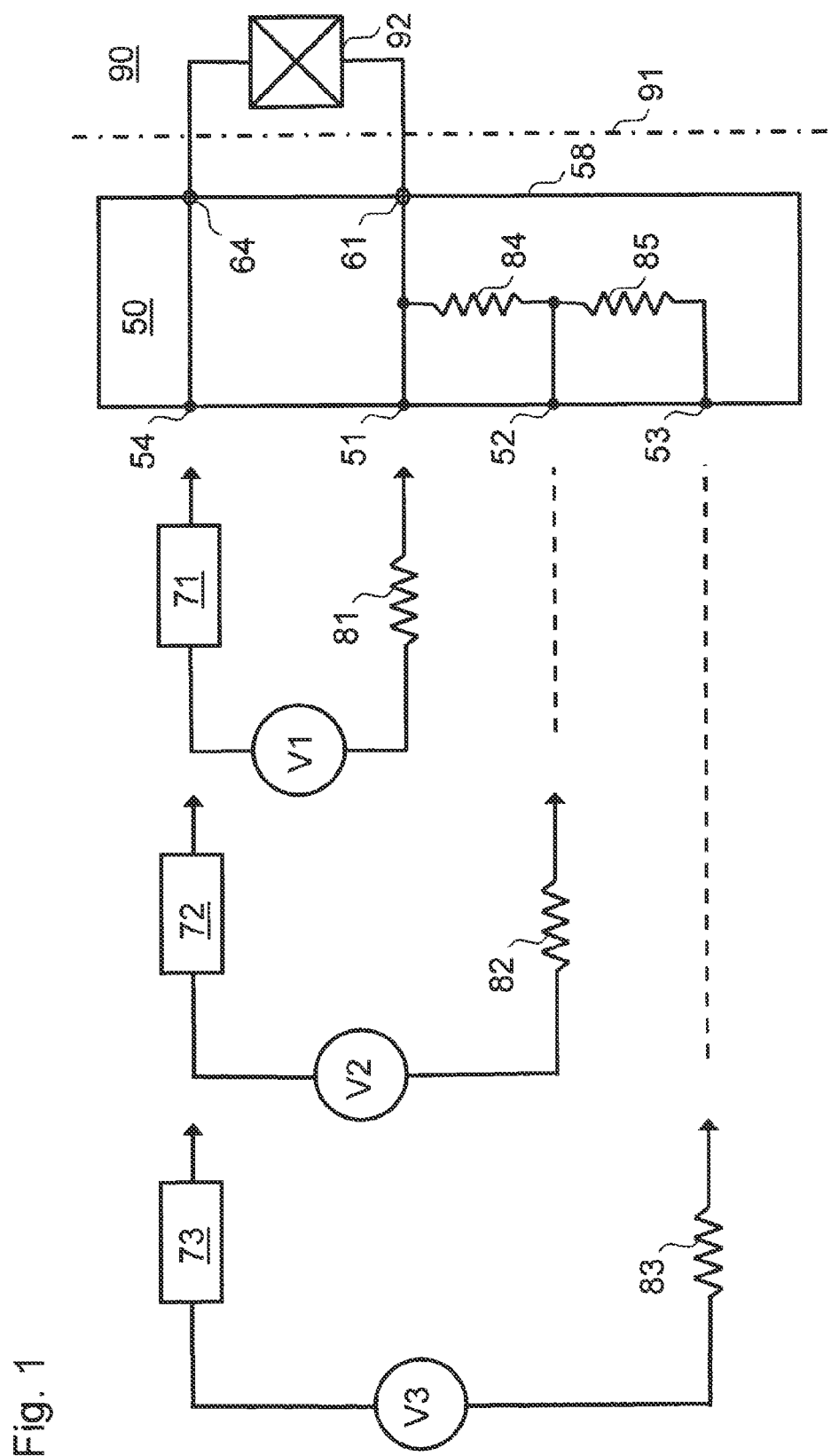

U.S. PATENT DOCUMENTS 7,443,056 B2 * 10/2008 Fisher ................. H01R 9/2425
307/116
2004/0252428 A1 12/2004 Junker

OTHER PUBLICATIONS

Hasubek, Search Report for International Application No. PCT/EP2012/000364 (with English translation), Oct. 25, 2012, 5 pages.

* cited by examiner

CONNECTION MODULE FOR FIELD DEVICE IN THE EXPLOSION-PROOF AREA

The present invention relates to a connection module for field devices in the explosion-protected area according to the preamble to claim 1.

A generic connection module has the following constituent parts: a housing having a plurality of controller-end terminals to connect to at least one input/output module and field-end terminals to connect to the field devices.

It has been usual up to now in process automation, in particular in the field of remote I/O, but also in interface technology, to provide a type-specific input and/or output module for connection to a controller for each type of field device, for example a sensor or an actuator. This module is adapted with its transmitter properties to the respective measuring or control method, for example analog 4 to 20 mA or binary, and also to the requirements of the protection class desired in each case.

A great number of module variants are thus necessary and there is comparatively limited flexibility during wiring, thus during connection of the individual devices, because the modules must be wired with different types of supplies, which requires great resources, and the field devices must be connected to the modules appropriate thereto. These wiring works are also referred to as "marshalling".

In addition, a power is generated via the protective resistors built into the modules, which is not insignificant and can lead to undesirable heating.

The prior art thus relates to respectively special input/output modules with intrinsically safe field current circuits which are each oriented to a certain type of field device and have fixed, intrinsically safe characteristic values. For example, there are binary inputs for Namur sensors, analog inputs for 4 to 20 mA transmitters, analog outputs for position controllers, binary outputs for magnetic valves, etc. The intrinsically safe input/output circuits known to date thus have a fixed and invariable function.

In addition the prior art relates to connection modules, in which simple wiring without any type of further functionality is carried out.

It can be regarded as an object of the invention to create a connection module, with which the provision of intrinsically safe supplies for field devices in the explosion-protected area is more flexible.

This object is achieved through the connection module having the features of claim 1.

The connection module of the abovementioned type is further developed according to the invention by different resistors being present in the housing to provide intrinsically safe pairs of field-end terminals with different characteristic values, said resistors being hardwired in the housing to different field-end terminals and/or controller-end terminals.

Preferred embodiments of the connection module according to the invention are the subject matter of the dependent claims and are also explained below, in particular in association with the figures.

The term "connection" or terminal is to be broadly interpreted in functional terms and in principle for the present description. Fundamentally, a connection or terminal is to be understood to be any type of electrical contact. In particular the connection module can be based upon connections which are formed in any manner by detachable connection technology, in particular through plug-in connections.

It can be regarded as a first core idea of the connection module according to the invention to also integrate—by way of a departure from the prior art—resistors or load resistors, in addition to mere wiring, into the connection module, said resistors or load resistors being used for current or power limitation for intrinsically safe outputs. The space available in the connection module can be effectively used in this way and in any case a proportion of the heat produced during the current limitation can be deposited without problems in this area.

A substantial advantage of the connection module according to the invention is on the one hand the achievable high flexibility having regard to the provision of different intrinsically safe connections and supplies. In addition there are advantages for the further components, in particular the input/output modules to be connected, in which resistors necessary to date for current or power limitation can have smaller dimensions or possibly be completely omitted.

The flexibility for the connection of field devices and/or current/voltage supplies can preferably be achieved by a plurality of controller-end terminals being present to connect a plurality of current/voltage supplies and, alternatively or additionally, by a plurality of field-end terminals being present to form a plurality of intrinsically safe pairs of field-end terminals.

The total effective power-limiting resistance for an intrinsically safe pair of field-end terminals can thereby be provided in full or completely in the housing of the connection module according to the invention.

Having regard to the specific wiring of the resistors in the connection module, there is in principle freedom of design. In the case of easily realised variants, which nonetheless facilitate great flexibility for different applications, a plurality of suitably interconnected individual resistors are provided in the housing to provide an effective power-limiting resistance for an intrinsically safe pair of field-end terminals.

For example a series connection of resistors can be present, wherein a plurality of pick-ups of the series connection are connected to controller-end terminals and/or field-end terminals.

According to a further particularly preferred variant of the connection module according to the invention the total effective power-limiting resistance has such dimensions that a plurality of active input/output modules can be connected in parallel to the connection module without impairing the intrinsic safety. Arrangements with particularly reliable operation are possible in this way.

It is useful and advantageous for the specific assembly of the connection module at the place of use if plug-in connections are present, for example to connect to a base board and/or to an input/output module. In addition, plug-in connections are particularly preferably present for special, simple circuits, which can be described as signal determining box, and with which further functionalities of the connection module, in particular of the field-end outputs can be defined and fixed. For example, further resistors can be present in such a signal determining box, through which a power-limiting resistance is provided in full or in part for an intrinsically safe output.

Finally, the connection module according to the invention also allows embodiments, in which a plurality of field devices can be simultaneously connected.

Figure 2:
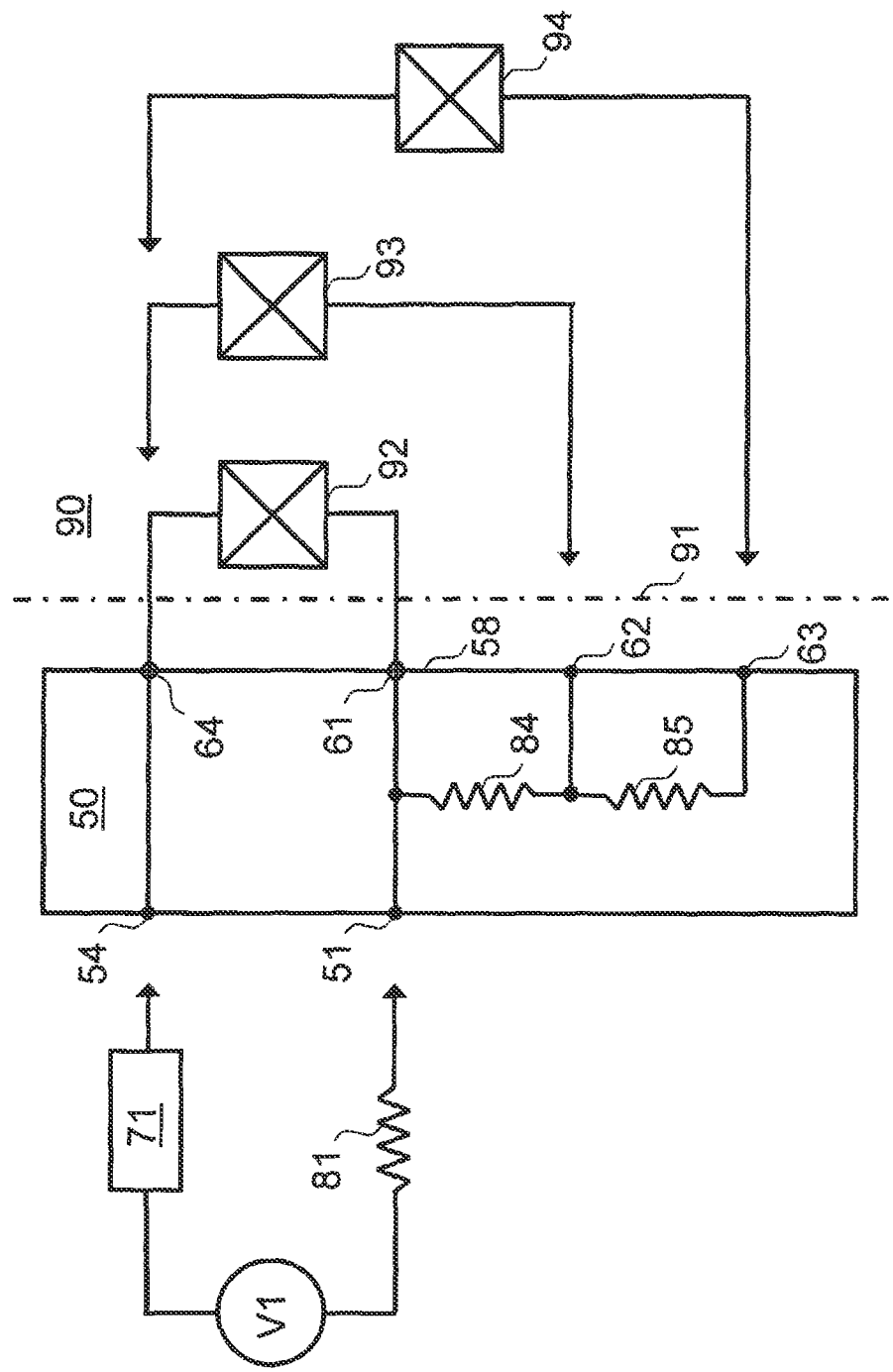

Further advantages and features of the present invention are explained below by reference to the drawing, in which:

FIG. 1 shows a first exemplary embodiment of a connection module according to the invention, and FIG. 2 shows a second exemplary embodiment of a connection module according to the invention.

The same components and those having the same effect are generally provided in both figures with the same reference numerals.

A first embodiment of a connection module 50 according to the invention is explained by reference to FIG. 1. The essential component of the connection module 50 according to the invention is a housing 58, on which controller-end terminals 51, 52, 53, 54 and in addition field-end terminals 61, 64 are formed. The controller-end terminals 51, 52, 53, 54 are used to connect intrinsically safe voltage supplies V1, 71, V2, 72, V3, 73, which are schematically shown in FIG. 1 and can each have different characteristic values. Resistors 81, 82, 83 are respectively provided as part of a total effective resistance for the current or power limitation, whereby said resistors 81, 82, 83 can be adapted having regard to the respectively required characteristic values of intrinsic safety. The field-end outputs 61, 64 are used to connect field devices 92 in the explosion-protected area 90, the delimitation of which is indicated in FIG. 1 by a vertical broken line 91.

A series connection comprising resistors 84, 85 is present in the connection module 50. The resistor 85 is connected between the controller-end terminals 52 and 53. The resistor 84 is connected between the terminals 52 and 51. In addition the terminal 51 is hardwired to the terminal 61. Finally, the terminal 54 is connected in the housing 58 through to the field-end terminal 64. The resistors 84 and 85 are appropriately chosen having regard to the necessary and desired characteristic values of the intrinsic safety.

The second embodiment of a connection module 50 according to the invention shown in FIG. 2 differs from the variant shown in FIG. 1 essentially in that, instead of only one pair of field-end terminals 61, 64, further field-end terminals 62, 63 are present. This allows in principle the connection of field devices 92, 93, 94 in the explosion-protected area in the manner indicated by arrows in FIG. 2. As in FIG. 1, a voltage divider formed by the resistors 84, 85 is present in the housing 58 of the connection module 50, whereby the first end point of said voltage divider is connected to the field-end terminal 63 and the second end point thereof is connected to the field-end terminal 61. A pick-up between the resistors 84, 85 is connected to the field-end terminal 62. As in FIG. 1, the terminals 61 and 51 on the one hand and 64 and 54 on the other hand are respectively interconnected in the housing 58 in a conductive manner with hardwiring. At the controller end the connection module 50 of FIG. 2 allows the connection to a voltage supply V1, 71.

The total effective resistance for the current limitation or power limitation is divided in both embodiments between individual resistors and is achieved through the interconnection of the resistors 81, ... , 85, as seen from the figures.

A universally usable connection module, which can also be described as a universal terminal base, is described with the present invention. The connection module according to the invention can be used as a support for an input/output module or a plurality of input/output modules and has intrinsically safe connection possibilities for one or more field devices. The connection module contains a plurality of resistors which can be effective for the intrinsically safe current limitation or power limitation and which can be guided via pick-ups to plug contacts. In dependence upon the respectively used contacts or connections, a different resistance can be effective for the intrinsic safety. The input/output module in combination with the connection module according to the invention can thereby set different characteristic values for the intrinsically safe connections, appropriate for the field device to be connected in each case in the explosion-protected area.

In the case of the common arrangements to date, the resistance effective for the intrinsic safety has been integrated at least in part into the input/output module. However, a redundant operating mode is thereby excluded, because the intrinsic safety is lost through the current addition. According to a modification, the resistance effective for the intrinsic safety can indeed be predominantly accommodated in the connection module. In this case, however, the resistor is to be chosen in a module-specific manner and the connection module can therefore no longer be universally used for different input/output modules.

The essential advantage of the connection module according to the invention with respect to solutions thus far, in which the effective resistance for the intrinsic safety was arranged at least in part in the input/output module, essentially comprises the lower power dissipation, thus lower heating, in the input/output module. In addition a redundant operation of input/output modules is possible without current doubling arising. The relevant input/output modules can be simply arranged in parallel in these variants.

A universal connection module for input/output modules with intrinsically safe input/output circuits is thus provided, in which a current limitation can be selected, using a plurality of connections or contacts, to a certain threshold current. The connection module can contain a series connection of resistors for current limitation of the intrinsically safe input/output circuits, wherein one or more pick-ups can be guided to plug contacts or other connections formed using a detachable connection technology. An individual current limitation can be realised by using a corresponding resistor pick-up. The total effective resistance for the intrinsic safety can be located in full or in part in the connection module according to the invention. Resistors are transferred into the connection module according to the invention, which can also be described as a terminal block, with the aid of which resistors, together with a supply of the voltages and currents from different sources through one or more input/output modules, a suitable terminal choice is possible with a plurality of possible choices for different input/output modules. The choice can be further extended with a signal determining box, which is also referred to as signal designator, in which further transferred resistors are arranged. In principle, a type of functional encoding is realised through the connection module according to the invention, in particular together with a signal determining box.

The invention claimed is:

1. Connection module for field devices in the explosion-protected area,
having a housing with a plurality of controller-end terminals to connect to at least one input/output module, and
having field-end terminals to connect to the field devices, wherein different resistors are present in the housing to provide intrinsically safe pairs of field-end terminals with different characteristic values, said different resistors being hardwired in the housing to different field-end terminals and/or controller-end terminals,
characterised in that
at least one series connection of resistors is present in the housing,
a plurality of pick-ups of the series connection are connected to controller-end terminals or field-end terminals,
a plurality of controller-end terminals are present to connect a plurality of current/voltage supplies, and a plurality of field-end terminals are present to form a plurality of intrinsically safe pairs of field-end terminals, a different resistance for the intrinsical effective in safety being effective in dependence of the respectively used terminals.

2. Connection module according to claim 1, characterised in that
the total effective power-limiting resistance for an intrinsically safe pair of field-end terminals is located completely in the housing.

3. Connection module according to claim 1, characterised in that
the total effective power-limiting resistance for an intrinsically safe pair of field-end terminals is located in part in the housing.

4. Connection module according to claim 1, characterised in that
a plurality of individual resistors are interconnected in the housing to provide an effective power-limiting resistance for an intrinsically safe pair of field-end terminals.

5. Connection module according to claim 1, characterised in that
the total effective power-limiting resistance for an intrinsically safe pair of field-end terminals has such dimensions that a plurality of active input/output modules can be connected in parallel without impairing the intrinsic safety.

6. Connection module according to claim 1, characterised in that
plug-in connections are present to connect to a base board.

7. Connection module according to claim 1, characterised in that
plug-in connections are present to connect to at least one input/output module.

8. Connection module according to claim 1, characterised in that
plug-in connections with a signal determining box are present.

9. Connection module according to claim 1, characterised in that
a plurality of field devices can be simultaneously connected.

* * * * *